United States Patent
Stratton

(10) Patent No.: US 12,359,623 B1
(45) Date of Patent: Jul. 15, 2025

(54) HYDROGEN TURBOEXPANDER FOR USE IN AN AVIATION PROPULSION SYSTEM

(71) Applicant: Pratt & Whitney Canada Corp., Longueuil (CA)

(72) Inventor: Russell Stratton, Toronto (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/630,587

(22) Filed: Apr. 9, 2024

(51) Int. Cl.
*F02C 7/22* (2006.01)
*B64D 27/10* (2006.01)

(52) U.S. Cl.
CPC ............... *F02C 7/22* (2013.01); *B64D 27/10* (2013.01); *F05D 2260/20* (2013.01)

(58) Field of Classification Search
CPC ...... F02C 3/22; F02C 1/02; F02C 6/12; F02C 6/00; F01D 15/10; F01D 25/168; F01D 17/162; F01D 17/165; F05D 2220/40; F05D 2260/213; F05D 2220/62; F05D 2220/76; F05D 2220/74; H02K 7/1823; Y02T 10/12; F25J 1/001; F25J 1/0067; F25J 1/005
See application file for complete search history.

(56) References Cited

U.S. PATENT DOCUMENTS

| | | | | |
|---|---|---|---|---|
| 6,892,542 B2 * | 5/2005 | Voinov | ...................... | F02C 7/22 60/39.465 |
| 7,571,607 B2 * | 8/2009 | Vrbas | ..................... | F04D 17/025 60/605.1 |
| 10,927,759 B2 * | 2/2021 | Ikeya | ..................... | F01D 25/22 |
| 11,293,306 B2 * | 4/2022 | Saito | ....................... | F02C 6/00 |
| 11,824,424 B2 | 11/2023 | Himmelmann | | |
| 12,071,257 B2 * | 8/2024 | Terwilliger | ............. | B64D 27/34 |
| 12,209,535 B2 * | 1/2025 | Smith | ....................... | F02C 9/40 |
| 12,212,214 B2 * | 1/2025 | Earl | ..................... | H02K 7/1823 |
| 2012/0306206 A1 * | 12/2012 | Agrawal | .................. | H02K 1/32 290/52 |
| 2017/0356333 A1 * | 12/2017 | Pesiridis | ............... | F01D 17/143 |
| 2023/0258106 A1 * | 8/2023 | Terwilliger | ............. | F01K 15/02 60/775 |

(Continued)

FOREIGN PATENT DOCUMENTS

| | | | | |
|---|---|---|---|---|
| AT | 526207 A1 * | 12/2023 | ........... | C01B 32/162 |
| CA | 3183666 A1 * | 6/2023 | ............. | F01D 15/10 |

(Continued)

*Primary Examiner* — Craig Kim
(74) *Attorney, Agent, or Firm* — Getz Balich LLC

(57) ABSTRACT

An aircraft propulsion system includes a gas turbine engine, a hydrogen-exhaust heat exchanger, and a hydrogen turboexpander. The hydrogen-exhaust heat exchanger is disposed relative to a turbine exhaust section so that a flow of exhaust gas exiting the engine is in communication with the hydrogen-exhaust heat exchanger. The hydrogen-exhaust heat exchanger changes a flow of liquid hydrogen to gaseous hydrogen. The hydrogen turboexpander has parallel first and second rotor shafts within a housing that includes a first and second rotor shaft cavities. The first rotor shaft and the first rotor shaft cavity define a first rotor shaft fluid flow path (RSFFP). The second rotor shaft and the second rotor shaft cavity define a second RSFFP. The first RSFFP is in series with the second RSFFP between an inlet port and an exit port. The exit port is in fluid communication with the combustor.

20 Claims, 8 Drawing Sheets

(56) References Cited

U.S. PATENT DOCUMENTS

| | | | |
|---|---|---|---|
| 2023/0258130 A1* | 8/2023 | Terwilliger | F02C 7/224 60/266 |
| 2023/0313736 A1 | 10/2023 | Himmelmann | |
| 2024/0010351 A1* | 1/2024 | Holley | F01D 15/10 |
| 2024/0102401 A1* | 3/2024 | Earl | F01D 15/10 |
| 2024/0113594 A1* | 4/2024 | Earl | F01D 15/10 |
| 2024/0229676 A1* | 7/2024 | Provenzano | H02K 7/1823 |
| 2024/0418121 A1* | 12/2024 | Smith | F02C 7/22 |

FOREIGN PATENT DOCUMENTS

| | | |
|---|---|---|
| CN | 217107224 U | 8/2022 |
| JP | 2023095452 A * | 7/2023 |

* cited by examiner

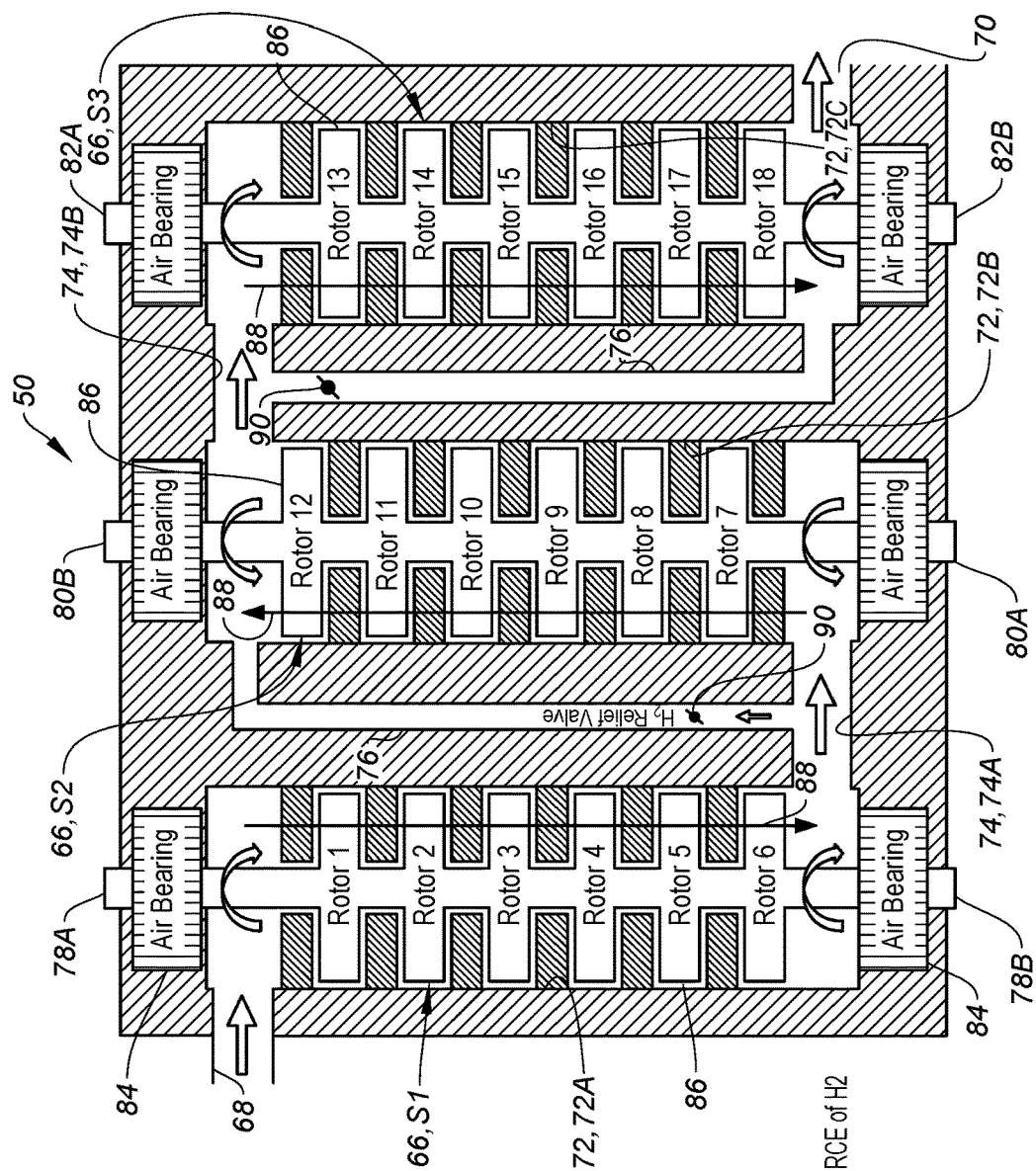
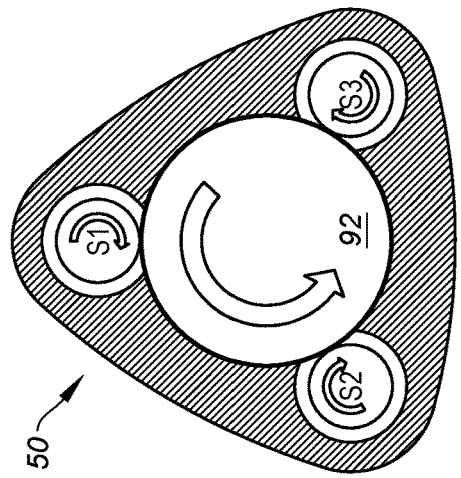
FIG. 7
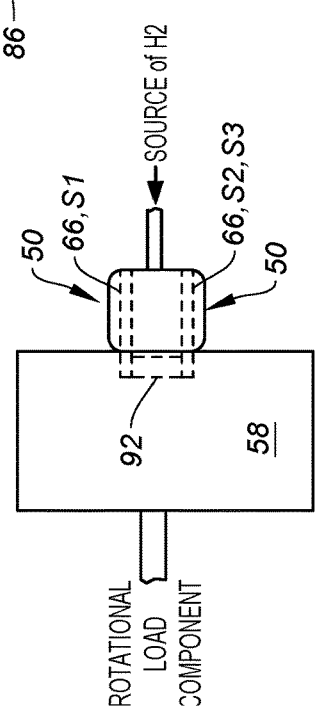
FIG. 7A
FIG. 7B

HYDROGEN TURBOEXPANDER FOR USE IN AN AVIATION PROPULSION SYSTEM

BACKGROUND OF THE DISCLOSURE

1. Technical Field

The present disclosure relates to aviation propulsion systems that combust hydrogen in general, and to aviation propulsion systems that utilize a hydrogen turboexpander in particular.

2. Background Information

There is a great need within the global aviation industry to reduce carbon emissions and to reduce contributors to global warming. As the demand for air travel continues to rise, the aviation industry is developing sustainable solutions that reduce the sector's climate impacts. In the medium to long term, hydrogen may be used as a fuel that is complementary or an alternative to conventional jet fuels, sustainable aviation fuels (SAFs), or the like. to enable zero-carbon aviation. Overall system efficiency of converting renewable energy to engine power is a critical element in enabling the adoption of low or zero carbon fuel options. Engines configured to combust hydrogen may improve energy efficiency by leveraging the cryogenic properties of hydrogen through advanced thermodynamic engine cycles. The low temperature of hydrogen is an attractive heat-sink for gas turbine systems and the expansion of the stored liquid hydrogen into a gaseous state offers energy release which can improve overall system efficiency. Mechanical systems operable to improve the extraction of energy from hydrogen are desirable.

SUMMARY OF THE DISCLOSURE

According to an aspect of the present disclosure, an aircraft propulsion system is provided that includes a gas turbine engine, a hydrogen-exhaust heat exchanger, and a hydrogen turboexpander. The gas turbine engine includes a compressor section, a combustion section having a combustor, a turbine section, and a turbine exhaust section. The gas turbine engine is in drive communication with a rotational load component. The hydrogen-exhaust heat exchanger is disposed relative to the turbine exhaust section so that a flow of exhaust gas exiting the turbine section is in communication with the hydrogen-exhaust heat exchanger. The hydrogen-exhaust heat exchanger is configured to change a flow of liquid hydrogen from a source of liquid hydrogen to a flow of gaseous hydrogen. The hydrogen turboexpander has a first rotor shaft and a second rotor shaft disposed parallel one another within a housing. The housing includes a first rotor shaft cavity configured to receive the first rotor shaft and a second rotor shaft cavity configured to receive the second rotor shaft. The housing further includes an inlet port to receive the flow of gaseous hydrogen and an exit port for the flow of gaseous hydrogen to exit the hydrogen turboexpander. The first rotor shaft and the first rotor shaft cavity define a first rotor shaft fluid flow path (RSFFP). The second rotor shaft and the second rotor shaft cavity define a second RSFFP. The hydrogen turboexpander is configured with the first RSFFP in series with the second RSFFP between the inlet port and the exit port. The exit port is in fluid communication with the combustor.

In any of the aspects or embodiments described above and herein, the first rotor shaft (FRS) has a FRS first axial end and a FRS second axial end and a plurality of first rotors, and wherein the second rotor shaft (SRS) has an SRS first axial end and an SRS second axial end and a plurality of second rotors, and the inlet port may be in fluid communication with the first rotor shaft adjacent the FRS first axial end of the first rotor shaft, and the first rotor shaft may be in fluid communication with the second rotor shaft via a first inter-rotor passage disposed adjacent the FRS second axial end and the SRS first axial end.

In any of the aspects or embodiments described above and herein, the second rotor shaft may be in fluid communication with the exit port adjacent the SRS second axial end.

In any of the aspects or embodiments described above and herein, the hydrogen turboexpander may include a bypass passage and a relief valve. The bypass passage is in fluid communication with the first inter rotor passage and in fluid communication with the second rotor shaft adjacent the SRS second axial end. The relief valve may be controllable to be in an open configuration that permits fluid flow through the bypass passage and in a closed configuration that at least substantially blocks fluid flow through the bypass passage. In the closed configuration, appreciably no fluid flow passes through the second RSFFP.

In any of the aspects or embodiments described above and herein, the relief valve may be in communication with a controller configured to control operation of the relief valve.

In any of the aspects or embodiments described above and herein, the first rotor shaft and the second rotor shaft may rotate independently of one another.

In any of the aspects or embodiments described above and herein, the hydrogen turboexpander may be configured such that the first rotor shaft rotates at a first rotational velocity, and the second rotor shaft rotates at a second rotational velocity, and the first rotational velocity equals the second rotational velocity.

In any of the aspects or embodiments described above and herein, the hydrogen turboexpander may be configured such that the first rotor shaft rotates at a first rotational velocity, and the second rotor shaft rotates at a second rotational velocity, and the first rotational velocity does not equal the second rotational velocity.

In any of the aspects or embodiments described above and herein, the hydrogen turboexpander may be configured such that the first rotor shaft produces a first amount of power from the flow of gaseous hydrogen, and the second rotor shaft produces a second amount of power from the flow of gaseous hydrogen, and the first amount of power equals the second amount of power.

In any of the aspects or embodiments described above and herein, the hydrogen turboexpander may be configured such that the first rotor shaft produces a first amount of power from the flow of gaseous hydrogen, and the second rotor shaft produces a second amount of power from the flow of gaseous hydrogen, and the first amount of power does not equal the second amount of power.

In any of the aspects or embodiments described above and herein, at least one of the first rotor shaft or the second rotor shaft may be in drive communication with a system component, and the system component may be a reduction gearbox or an electric generator.

In any of the aspects or embodiments described above and herein, the hydrogen turboexpander may further include a third rotor shaft and the housing may further include a third rotor shaft cavity configured to receive the third rotor shaft, and wherein the third rotor shaft and the third rotor shaft cavity define a third RSFFP, and wherein the first rotor shaft, the second rotor shaft, and the third rotor shaft are disposed parallel one another within a housing, and wherein the third rotor shaft (TRS) has a TRS first axial end and a TRS second axial end and a plurality of third rotors, and the inlet port may be in fluid communication with first rotor shaft adjacent the FRS first axial end, and the first rotor shaft may be in fluid communication with the second rotor shaft via a first inter rotor passage disposed adjacent the FRS second axial end, and the second rotor shaft may be in fluid communication with the third rotor shaft via a second inter rotor passage disposed adjacent to the SRS second axial end, and the third rotor shaft may be in fluid communication with the exit port adjacent the TRS second axial end.

In any of the aspects or embodiments described above and herein, the hydrogen expander may include a first bypass passage and a first relief valve, wherein the first bypass passage is in fluid communication with the first inter rotor passage and in fluid communication with the second rotor shaft adjacent the SRS second axial end, and the first relief valve may be controllable to be in a first open configuration that permits fluid flow through the first bypass passage and in a first closed configuration that at least substantially blocks fluid flow through the first bypass passage, and wherein in the first closed configuration appreciably no fluid flow passes through the second RSFFP, and the hydrogen turboexpander may include a second bypass passage and a second relief valve, wherein the second bypass passage is in fluid communication with the second inter rotor passage and in fluid communication with the third rotor shaft adjacent the TRS second axial end, and the second relief valve may be controllable to be in a second open configuration that permits fluid flow through the second bypass passage and in a second closed configuration that at least substantially blocks fluid flow through the second bypass passage, and wherein in the second closed configuration appreciably no fluid flow passes through the third RSFFP.

In any of the aspects or embodiments described above and herein, the first rotor shaft, the second rotor shaft, and the third rotor shaft may rotate independently of one another.

In any of the aspects or embodiments described above and herein, the hydrogen turboexpander may be configured such that the first rotor shaft rotates at a first rotational velocity, the second rotor shaft rotates at a second rotational velocity, and the third rotor shaft rotates at a third rotational velocity, and the hydrogen turboexpander may be operable in a first configuration wherein the first rotational velocity, the second rotational velocity, and the third rotational velocity equal one another, and may be operable in a second configuration wherein one of the first rotational velocity, the second rotational velocity, or the third rotational velocity does not equal another of the first rotational velocity, the second rotational velocity, or the third rotational velocity.

In any of the aspects or embodiments described above and herein, at least one of the first rotor shaft, the second rotor shaft, or the third rotor shaft may be in drive communication with a reduction gearbox.

In any of the aspects or embodiments described above and herein, the first rotor shaft, the second rotor shaft, and the third rotor shaft may be disposed in a symmetrical arrangement about a center of the housing.

In any of the aspects or embodiments described above and herein, at least one of the first rotor shaft, the second rotor shaft, or the third rotor shaft may be in drive communication with an electric generator.

According to an aspect of the present disclosure, a hydrogen turboexpander is provided that includes a housing, a first rotor shaft, and a second rotor shaft. The housing has a first rotor shaft cavity, a second rotor shaft cavity, a gas inlet port, and a gas exit port. The first rotor shaft is disposed in the first rotor shaft cavity. The second rotor shaft is disposed in the second rotor shaft cavity. The first and second rotor shafts are disposed parallel one another within the housing. The first rotor shaft and the first rotor shaft cavity define a first rotor shaft fluid flow path (RSFFP), and the second rotor shaft and the second rotor shaft cavity define a second RSFFP. The hydrogen turboexpander is configured with the first RSFFP in series with the second RSFFP between the inlet port and the exit port.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 7 is a schematic end view of a present disclosure turboexpander embodiment.

FIG. 7A is a schematic unfolder view of the turboexpander embodiment shown in FIG. 7.

FIG. 7B diagrammatically illustrates the turboexpander embodiment shown in FIG. 7 mounted on a reduction gearbox.

DETAILED DESCRIPTION

Figure 1:
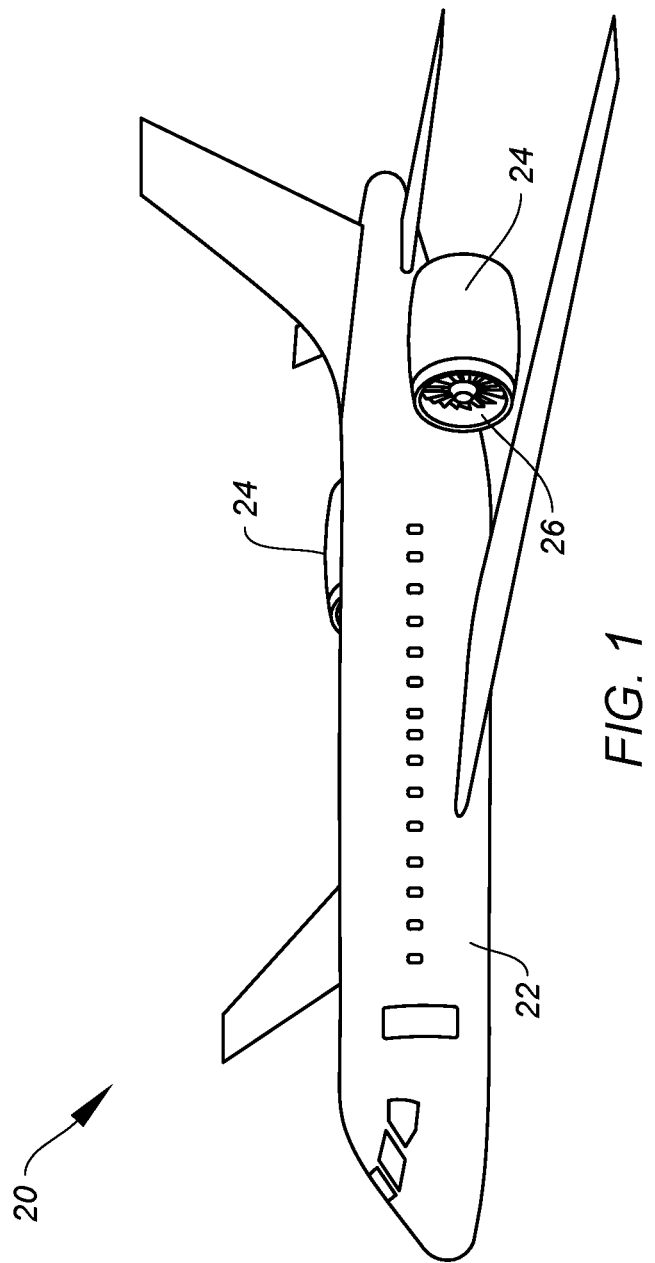
FIG. 1 is a diagrammatic illustration of an aircraft that may include present disclosure propulsion systems.

FIG. 1 illustrates a conventional fixed wing aircraft 20 that may utilize embodiments of the present disclosure. The aircraft 20 includes a fuselage 22 and a pair of nacelles 24. Each nacelle 24 houses a propulsion system 26 that provides thrust for the aircraft 20.

Figure 2:
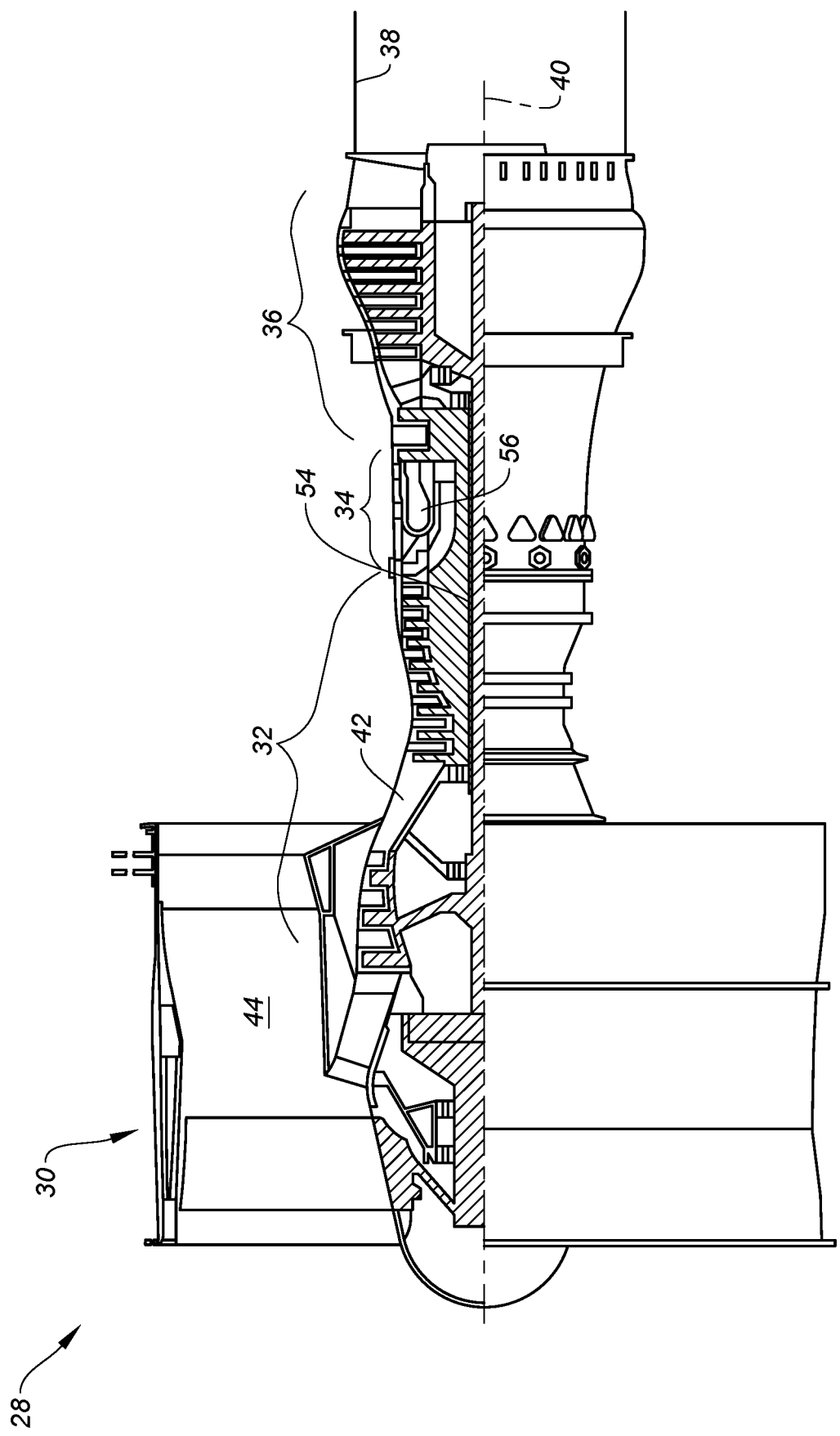
FIG. 2 is a diagrammatic representation of a gas turbine engine.

FIG. 2 diagrammatically illustrates an example of a turbine engine 28 that may be used in a present disclosure propulsion system 26 embodiment. The turbine engine 28 includes a fan section 30, a compressor section 32, a combustion section 34, a turbine section 36, a turbine exhaust section 38, and a rotational axis 40. Air entering the forward/upstream end of the turbine engine 28 passes through the fan section 30. A portion of the air worked within the fan section 30 enters the compressor section 32 and travels generally axially through the compressor, combustion, and turbine sections 32, 34, 36, exiting through a turbine exhaust section 38. This gas path may be referred to as the "core gas path 42". The remainder of the air worked within the fan section 30 enters a bypass duct 44 and is typically referred to as "bypass air". Both the bypass air and the core gas produce thrust that may be used for propulsion. The present disclosure is not limited to the turbine engine 28 example shown in FIG. 2. For example, in some embodiments the turbine engine 28 may be configured as a geared turbine engine that drives the fan section 30 (or a propeller) of a propulsion system 26 at a lower rotational speed than the rotational speed of an engine shaft.

The terms "forward", "leading", "aft, "trailing" may be used herein to indicate the relative position of a component or surface within the turbine engine 28. In an engine like that shown in FIG. 2, the fan section 30 is "forward" of the compressor section 32 and the turbine section is "aft" of the compressor section 32. The terms "upstream" and "downstream" used herein refer to the direction of a gas flow passing through an annular gas path of the turbine engine 28. The terms "radial" and "circumferential" may also be used herein with respect to the rotational axis of the turbine engine 28.

Figure 3:
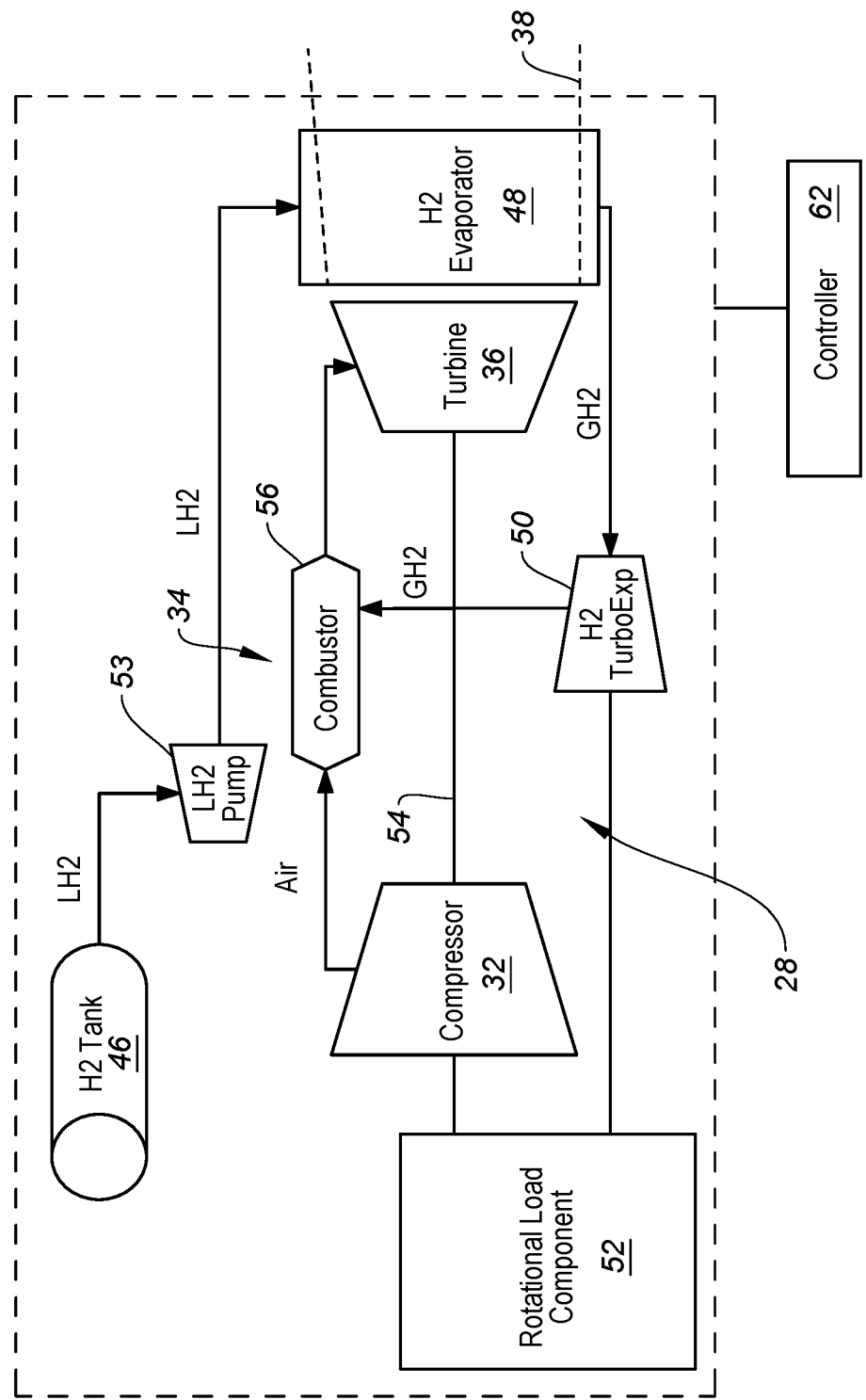
FIG. 3 is a schematic representation of a present disclosure propulsion system embodiment.

FIG. 3 schematically illustrates a present disclosure propulsion system 26 embodiment that includes a source of hydrogen (e.g., a liquid hydrogen tank 46), a turbine engine 28 powered by hydrogen, a hydrogen/exhaust heat exchanger 48 (labeled as "H2 Evaporator"), a gaseous hydrogen turboexpander 50 (labeled as "H2 TurboExp"), and a rotational load component 52. In some embodiments (e.g., like that schematically shown in FIG. 3) the present disclosure propulsion system 26 may include a liquid hydrogen pump 53 (labeled as "LH2 Pump") and a controller.

The turbine engine 28 includes a compressor section 32, a combustion section 34, a turbine section 36, and a shaft 54 connecting the compressor section 32 to the turbine section 36 and the rotational load component 52. The compressor section 32 represents a single compressor section or a plurality of compressor sections; e.g., a high pressure compressor ("HPC") and a low pressure compressor ("LPC"). The compressor section 32 may include axial type compressors, or centrifugal type compressors, or any combination of axial and radial compressors. The combustion section 34 includes a combustor 56. The turbine section 36 represents a single turbine section or a plurality of turbine sections; e.g., a high pressure turbine ("HPT") and a low pressure turbine ("LPT"). The shaft 54 represents a single shaft or multiple shafts; e.g., a low pressure shaft and a high pressure shaft. The turbine engine 28 is in drive communication with the rotational load component 52; i.e., the propulsion system 26 is configured so that the turbine engine 28 drives the rotational load component 52. As will be described herein, in some embodiments the gaseous hydrogen turboexpander 50 may also be in drive communication with the rotational load component 52. Hence, and depending on the embodiment, the rotational load component 52 may be driven by the turbine engine 28, or by the gaseous hydrogen turboexpander 50, or some combination thereof. Non-limiting examples of a rotational load component 52 include a propeller, a reduction gear box, a fan, a rotor, or the like, or any combination thereof. For example, a reduction gear box 58 (e.g., see FIG. 7B) may be driven by the turbine engine 28 and/or the gaseous hydrogen turboexpander 50 and, in turn, the reduction gear box 58 may be in drive communication with the fan, propeller, rotor, or the like. The present disclosure is not limited to any particular turbine engine 28 configuration.

Figure 4:
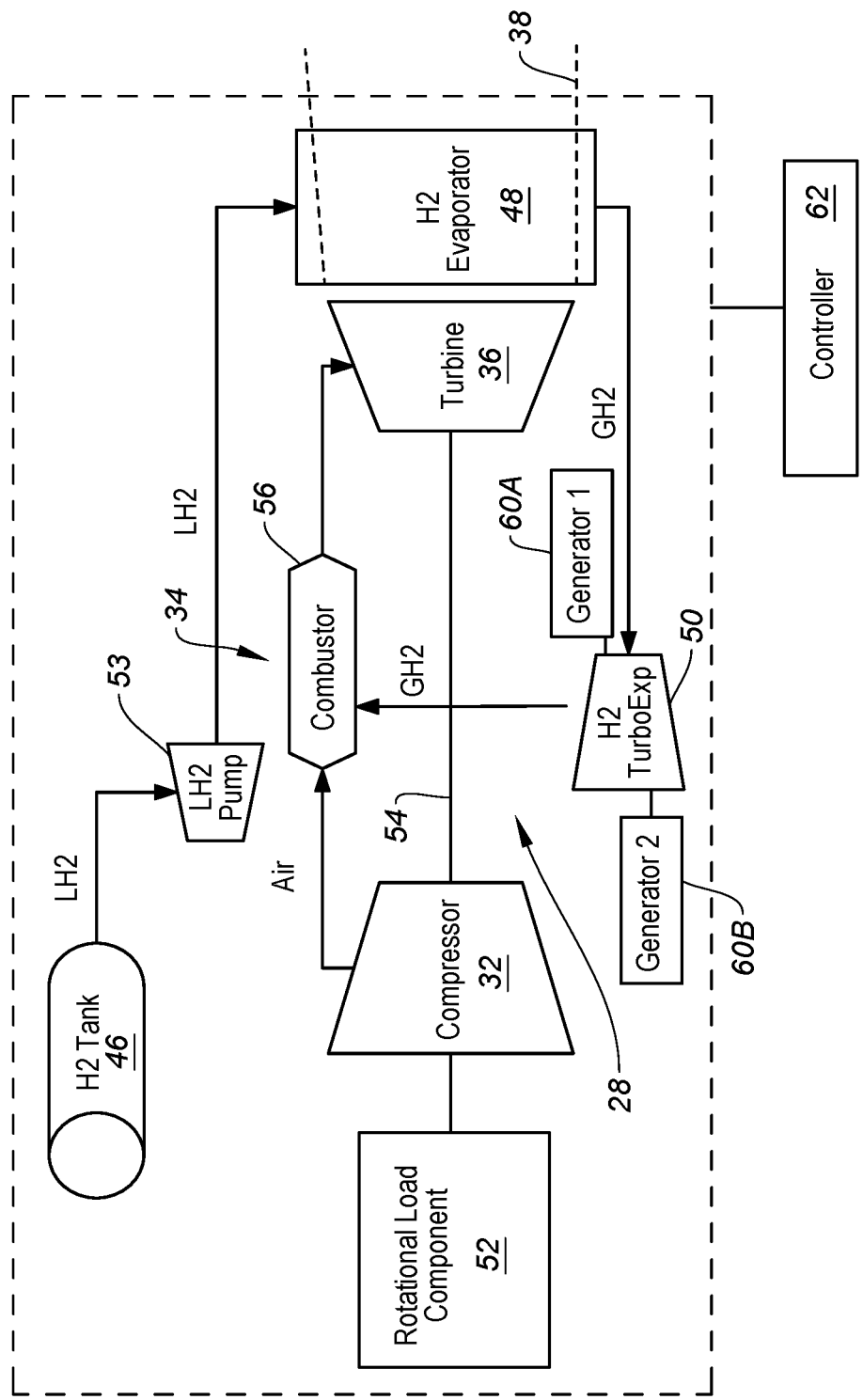
FIG. 4 is a schematic representation of a present disclosure propulsion system embodiment.

FIG. 4 schematically illustrates a present disclosure propulsion system 26 embodiment that is similar to that schematically shown in FIG. 3. In this embodiment, the gaseous hydrogen turboexpander 50 is shown in drive communication with a first electrical generator 60A (labeled as "Generator 1") and a second electrical generator 60B (labeled as "Generator 2"). The present disclosure is not limited to this configuration. For example, the gaseous hydrogen turboexpander 50 may be configured for drive communication with a component other than an electrical generator. As another example, the gaseous hydrogen turboexpander 50 may be configured for drive communication with one component, or more than two components, and those components may be the same type of component or they may be different types of components.

The hydrogen/exhaust heat exchanger 48 is disposed within the exhaust gas stream exiting the turbine section of the turbine engine 28; i.e., within the turbine exhaust section 38. The hydrogen/exhaust heat exchanger 48 is configured to receive a flow of liquid hydrogen and subject that liquid hydrogen to the high temperature exhaust gas stream exiting the turbine section 36 during operation of the turbine engine 28. The hydrogen/exhaust heat exchanger 48 is configured to keep the flow of liquid hydrogen separate from the high temperature exhaust gas stream. The thermal energy transferred from the exhaust gas stream to the liquid hydrogen via the hydrogen/exhaust heat exchanger 48 causes the liquid hydrogen ("LH2") to change from a liquid phase to a gaseous phase ("GH2"). The system shown in FIG. 3 includes a liquid hydrogen pump 53 configured to provide a flow of liquid hydrogen from a liquid hydrogen source (e.g., a liquid hydrogen fuel tank 46) to the hydrogen/exhaust heat exchanger 48.

In some embodiments, the exhaust gas path upstream of the hydrogen/exhaust heat exchanger 48 may be configured to diffuse the exhaust gas flow prior to it engaging with the hydrogen/exhaust heat exchanger 48 to decrease the velocity of the exhaust gas.

The system schematically shown in FIG. 3 has a flow of liquid hydrogen from a source of liquid hydrogen (e.g., the liquid hydrogen tank 46) to the liquid hydrogen pump 53, a flow of liquid hydrogen from the liquid hydrogen pump 53 to the hydrogen/exhaust heat exchanger 48, a flow of gaseous hydrogen from the hydrogen/exhaust heat exchanger 48 to the gaseous hydrogen turboexpander 50, and a flow of gaseous hydrogen from the gaseous hydrogen turboexpander 50 to the combustor 56. The present disclosure system may include fluid flow control devices within the aforesaid hydrogen (liquid and/or gaseous) flow paths to control the flow of hydrogen. Some or all of these fluid flow control devices may be controlled by a controller 62 (detailed herein) to accomplish the operation of the present disclosure propulsion system 26.

The gaseous hydrogen turboexpander 50 is configured to utilize a flow of gaseous hydrogen from the hydrogen/exhaust heat exchanger 48 to provide drive power that may be used to drive the rotational load component 52, or to drive one or more propulsion system 26 components (e.g., an electrical generator 60A, 60B), or any combination thereof. Gaseous hydrogen exiting the gaseous hydrogen turboexpander 50 is provided to the combustor 56 of the turbine engine 28 for combustion therein.

Referring to FIGS. 5-8, the turboexpander 50 includes a housing 64 and a plurality of rotor shafts 66 disposed within the housing 64. The housing 64 includes a hydrogen (H2) inlet port 68 and an H2 exit port 70. The H2 inlet port 68 is in fluid communication with the hydrogen/exhaust heat exchanger 48 and the H2 exit port 70 is in fluid communication with the combustor 56. In some embodiments, the system may include other components in fluid communication between the H2 exit port 70 and the combustor 56, including one or more of an accumulator, a fuel metering unit or other fuel control devices, a fuel manifold, sensors, and the like. The housing 64 includes a rotor shaft cavity 72 for each rotor shaft 66 disposed within the housing 64; e.g., see FIGS. 5, 6, and 7A—a first rotor shaft cavity 72A for the first rotor shaft 66 ("S1"), a second rotor shaft cavity 72B for the second rotor shaft 66 ("S2"), a third rotor shaft cavity 72C for the third rotor shaft 66 ("S3"), and so on. As will be detailed herein, the housing 64 further includes an inter rotor passages 74A, 74B between sequential rotor shaft cavities 72A, 72B, 72C, and a bypass passage 76 between sequential rotor shaft cavities 72A, 72B, 72C that permits a downstream rotor shaft 66 to be bypassed. In some embodiments, the housing 64 may be configured for mounting on, for example, a reduction gear box 58 (e.g., see FIG. 7B).

Figure 5:
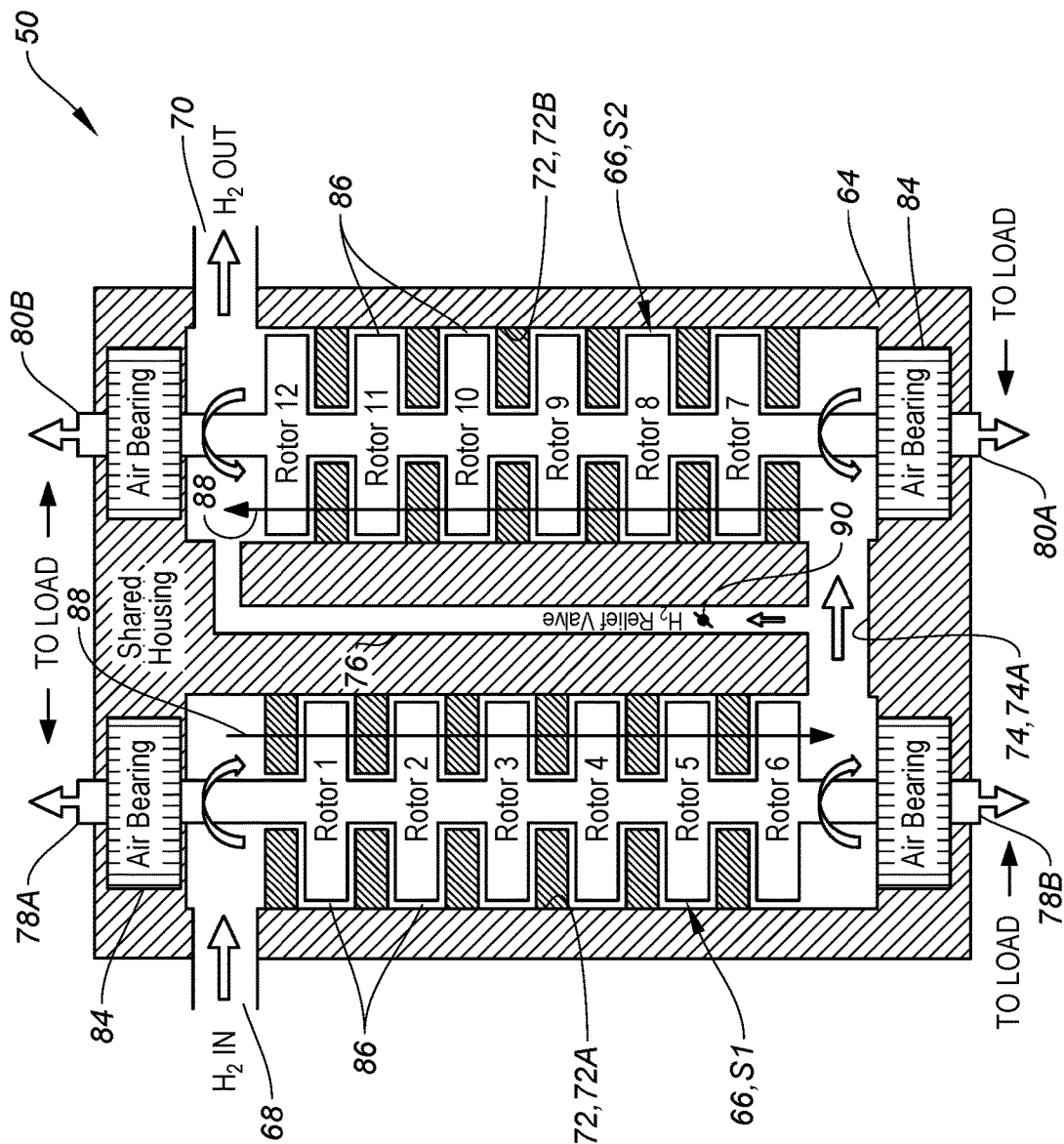
FIG. 5 is a schematic representation of a present disclosure turboexpander embodiment.
Figure 6:
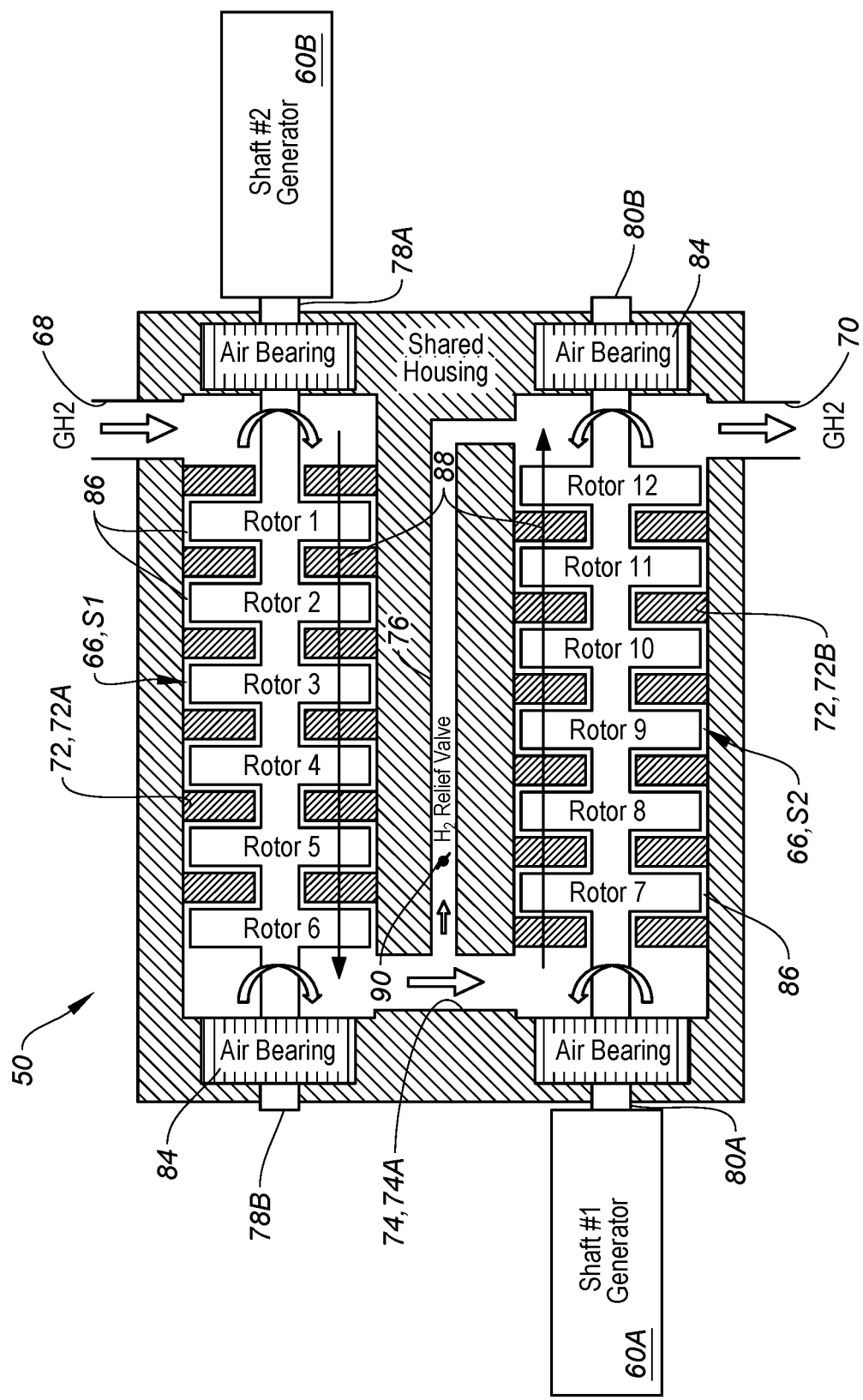
FIG. 6 is a schematic representation of a present disclosure turboexpander embodiment.

The turboexpander 50 embodiment schematically shown in FIGS. 5 and 6 includes a first rotor shaft 66 ("S1") disposed in a first rotor cavity 72A and a second rotor shaft 66 ("S2") disposed in a second rotor cavity 72B. The turboexpander 50 embodiment schematically shown in FIGS. 7-7B includes a first rotor shaft 66 ("S1") disposed in a first rotor cavity 72A, a second rotor shaft 66 ("S2") disposed in a second rotor cavity 72B, and a third rotor shaft 66 ("S3") disposed in a third rotor cavity 72C. The rotor shafts 66 (S1, S2, S3) are arranged parallel one another within the housing 64. To facilitate the description of gaseous hydrogen flow through the turboexpander 50, each rotor shaft 66 will be described as having a first axial end, a second axial end, and a rotational axis that extends between the opposing first and second axial ends. The designation of "first axial end" is used to identify the axial end that is upstream during the normal path (i.e., no bypass) of the gaseous hydrogen through the turboexpander 50. In view thereof, the first rotor shaft 66, S1 (FRS) is described as having a FRS first axial end 78A and a FRS second axial end 78B. The second rotor shaft 66, S2 (SRS) is described as having a SRS first axial end 80A and a SRS second axial end 80B. The third rotor shaft 66, S3 (TRS; e.g., see the embodiment shown in FIGS. 7-7B) is described as having a TRS first axial end 82A and a TRS second axial end 82B. Bearings 84 (e.g., air bearings, conventional bearings, or the like) support each rotor shaft 66 for rotational movement relative to the housing 64. The present disclosure is not limited to any particular rotor shaft bearing 84 configuration. In some embodiments, the first axial end 78A, 80A, 82A of a rotor shaft 66 may be configured for engagement with an external component (e.g., a drive shaft, a pump shaft, an electric generator shaft, or the like), or the second axial end 78B, 80B, 82B of a rotor shaft 66 may be configured for engagement with an external component, or both the first and second axial ends 78A, 78B, 80A, 80B, 82A, 82B of the rotor shaft 66 may be configured for engagement with external components. In some embodiments, an axial end of a rotor shaft 66 may be free of engagement with an external component; e.g., may not be mechanically connected outside of the housing 64. Each rotor shaft 66 includes a plurality of rotor stages 86 and, in combination with the respective rotor shaft cavity 72 in the housing 64, defines a rotor shaft fluid flow path 88 (RSFFP) for that respective rotor shaft 66; e.g., gaseous hydrogen passes through an inlet of a rotor shaft fluid flow path 88, then sequentially engages with the rotor stages 86 of the respective rotor shaft 66, expanding the gaseous hydrogen along the way, and then passes through an exit of the rotor shaft fluid flow path 88 for the respective rotor shaft 66. Each rotor shaft fluid flow path 88 is in fluid communication with an adjacent rotor shaft fluid flow 88 path by a respective inter rotor passage 74.

Subject to a fluid flow bypass as will be detailed herein, the connected rotor shaft fluid flow paths 88 create a single fluid flow path for expanding the gaseous hydrogen across all the rotor shafts 66 disposed within the housing 64; e.g., from the H2 inlet port 68 to a first RSFFP 88, and then to a second RSFFP 88, and then to the H2 exit port 70 as shown schematically in FIGS. 5 and 6. In the embodiment shown in FIG. 7A, the single fluid flow path across all the rotor shafts 66 disposed within the housing 64 includes: from the H2 inlet port 68 to a first RSFFP 88, and then to a second RSFFP 88 (via inter rotor passage 74A), and then to a third RSFFP 88 (via inter rotor passage 74B), and then to the H2 exit port 70. FIG. 7A is a schematic "unfolded" view of the triangular arrangement shown in FIG. 7, showing the first, second and third RSFFPs 88 side-by-side to facilitate showing the flow paths through the turboexpander 50.

The turboexpander 50 may be configured so that the rotor shafts 66 rotate independently of one another within the housing 64. The turboexpander 50 may also be configured so that the rotor shafts 66 rotate at the same rotational velocity (RV) (i.e., S1 RV=S2 RV), or alternatively the turboexpander 50 may be configured so that different rotor shafts 66 rotate at different rotational velocities (i.e., S1 RV≠S2 RV). In some embodiments, different (or same) rotational velocities may be achieved by configuring a given rotor shaft 66 (e.g., configuring the rotor shaft 66 diameter) based on the rotor shaft 66 position in the series hydrogen expansion flow within the turboexpander 50. In some embodiments, the turboexpander 50 may be configured so that the rotor shafts 66 each produce the same amount of power, or select different amounts of power for a given flow of gaseous hydrogen. The turboexpander 50 may be configured so that each rotor shaft 66 produces a certain predetermined amount of power for a given gaseous hydrogen flow by using differently configured rotor shafts 66 in series and/or by using bypass passages 76 and relief valves 90 as will be detailed herein. As will be detailed herein, the power produced by a plurality of the rotor shafts 66 may be combined via a gearbox 58 (e.g., as described herein and shown in FIG. 7) or the power produced by a respective rotor shaft 66 may be singularly used to power a particular component; e.g., an electric generator 60A, 60B as shown in FIG. 6. The rotor shafts 66 within a given turboexpander 50 may not be identical because the hydrogen is progressively expanded across the rotor shafts 66 in series. The multiple rotor shaft 66 design of the present disclosure reduces the length of individual rotor shafts 66 for a given expansion ratio and reduces the load per rotor shaft 66.

A bypass passage 76 and relief valve 90 may be in fluid communication at the exit of a respective rotor shaft fluid flow path 88 that permits a subsequent/downstream rotor shaft 66 and rotor shaft fluid flow path 88 to be bypassed. The relief valve 90 may be configured to alter fluid flow within the bypass passage 76. For example, in some embodiments the relief valve 90 may be controlled to be in a fully open configuration or in a completely closed configuration. The "completely closed" configuration may block 100% of fluid flow through the bypass passage 76, or the "completely closed" configuration may block substantially all of the fluid flow through the bypass passage 76. A relief valve 90 that substantially blocks fluid flow through the bypass passage 76 may permit an inconsequential amount of fluid flow (i.e., leakage) in operational terms; e.g., the flow leakage through the substantially closed relief valve 90 does not affect the performance of the turboexpander 50. In some embodiments, the relief valve 90 may be controlled to be in a plurality of open configurations (e.g., 25% open, 50% open, 75% open, and the like) or in a completely closed configuration. The bypass passage(s) 76 and relief valve(s) 90 allow the hydrogen passing through the turboexpander 50 to bypass expansion on a downstream rotor shaft(s) 66, thereby providing flexibility to manage variable pressures from connected systems upstream and downstream of the turboexpander 50.

Figure 8:
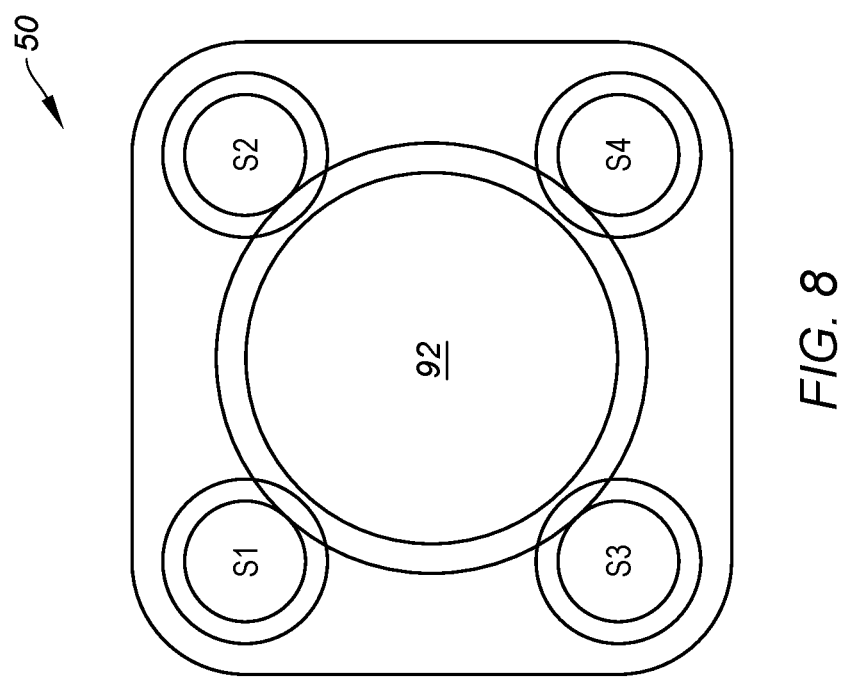
FIG. 8 is a schematic representation of a present disclosure turboexpander embodiment.

The hydrogen turboexpander 50 embodiment shown in FIGS. 7 and 7A is a symmetrical arrangement wherein the turboexpander housing 64 is triangular in shape (e.g., a triangular shape that is generally equilateral) with rounded surfaces at the intersections between the sides of the housing 64. The rotor shafts 66—S1, S2, S3 (parallel one another) are disposed symmetrically about the center of the triangular shaped body. In FIGS. 7 and 7A, the symmetrically positioned rotor shafts 66 are each positioned to symmetrically engage with a gear; e.g., a sun gear 92 disposed within a reduction gearbox 58. FIG. 7 is a diagrammatic planar view illustrating a sun gear 92 engaged with each of the rotor shafts 66; i.e., S1, S2, and S3. FIG. 7B is a schematic side view illustrating a sun gear 92 disposed within a reduction gearbox 58 with the rotor shafts 66 received within the reduction gearbox 58 for engagement with the sun gear 92. In such an arrangement, the hydrogen turboexpander 50 may be mounted directly to the reduction gearbox 58, in a lightweight, compact configuration that produces power for driving the reduction gearbox 58. The present disclosure is not limited to the symmetrical triangular configuration shown in FIG. 7; e.g., FIG. 8 illustrates a symmetrical rectangular (e.g., square) turboexpander 50 arrangement to illustrate other turboexpander 50 configurations are contemplated within the present disclosure. The present disclosure is also not limited to a multi-shaft arrangement disposed in a symmetrical configuration. For example, as described above the present disclosure contemplates embodiments wherein rotor shafts 66 may have different configurations; e.g., different rotor diameters, or the like. In such embodiments, the multi-shaft arrangement may not be symmetrical; e.g., not an equilateral arrangement.

In some embodiments, the operation of components of the present disclosure propulsion system 26 may be controlled using a controller 62; e.g., see FIGS. 3 and 4. The controller 62 may be in communication with system components (e.g., the relief valves 90 within a turboexpander 50) to control the operation of the respective component and/or to receive signals from and/or transmit signals to that component to perform the functions described herein. The controller 62 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The controller 62 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The controller 62 may include, or may be in communication with, an input device that enables a user to enter data and/or instructions, and may include, or be in communication with, an output device configured, for example to display information (e.g., a visual display or a printer), or to transfer data, etc. In some embodiments, a controller 62 may be dedicated to a particular system component. In other embodiments, a controller 62 may be in communication with a plurality of system components, controlling each, or controlling one or more components with signal input from other components. In some embodiments, a controller 62 may be an engine controller typically associated with aircraft operational control (e.g., a FADEC) that is configured to control propulsion system 26 components. In some embodiments, a plurality of controllers may be configured to operate in a network configuration. The present disclosure is not limited to any particular controller architecture.

During operation of the present disclosure propulsion system 26 shown in FIGS. 3 and 4, liquid hydrogen from the source of liquid hydrogen (e.g., the liquid hydrogen fuel tank 46) is pumped to the hydrogen/exhaust heat exchanger 48 disposed within the exhaust gas stream exiting the turbine section of the turbine engine 28. Operation of the turbine engine 28 produces high-temperature exhaust gases that engage the hydrogen/exhaust heat exchanger 48. Thermal energy is transferred from the exhaust gas stream to the liquid hydrogen via the hydrogen/exhaust heat exchanger 48 and the thermal energy transfer causes the liquid hydrogen to change from a liquid phase to a gaseous phase. The now gaseous hydrogen may be passed subsequently to the turboexpander 50 to provide drive power that may be used to drive the rotational load component 52, or to drive a system component (e.g., an electric generator 60A, 60B), or some combination thereof. Gaseous hydrogen exiting the turboexpander 50 is then provided to the combustor 56 of the turbine engine 28 for combustion therein. Prior to the turbine engine 28 producing a high-temperature exhaust gas stream exiting the turbine section, the system 26 may include a supplemental source of gaseous hydrogen that can be utilized within the combustor 56 for combustion. As the turbine engine 28 begins operation and begins producing an exhaust gas stream exiting the turbine section 36 at a temperature sufficient to change hydrogen from a liquid phase to a gaseous phase, the supplemental source of gaseous hydrogen can be phased out in favor of the gaseous hydrogen produced via the hydrogen/exhaust heat exchanger 48.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An aircraft propulsion system, comprising:
a gas turbine engine having a compressor section, a combustion section having a combustor, a turbine section, and a turbine exhaust section, wherein the gas turbine engine is in drive communication with a rotational load component;
a hydrogen-exhaust heat exchanger disposed relative to the turbine exhaust section so that a flow of exhaust gas exiting the turbine section is in communication with the hydrogen-exhaust heat exchanger, wherein the hydrogen-exhaust heat exchanger is configured to change a flow of liquid hydrogen from a source of liquid hydrogen to a flow of gaseous hydrogen; and
a hydrogen turboexpander having a first rotor shaft and a second rotor shaft disposed parallel one another within a housing, the housing including a first rotor shaft cavity configured to receive the first rotor shaft and a second rotor shaft cavity configured to receive the second rotor shaft, the housing further including an inlet port to receive the flow of gaseous hydrogen and an exit port for the flow of gaseous hydrogen to exit the hydrogen turboexpander, wherein the first rotor shaft and the first rotor shaft cavity define a first rotor shaft fluid flow path (RSFFP), and the second rotor shaft and the second rotor shaft cavity define a second RSFFP;
wherein the hydrogen turboexpander is configured with the first RSFFP in series with the second RSFFP between the inlet port and the exit port; and
wherein the exit port is in fluid communication with the combustor.

2. The system of claim 1, wherein the first rotor shaft (FRS) has a FRS first axial end and a FRS second axial end and a plurality of first rotors, and wherein the second rotor shaft (SRS) has an SRS first axial end and an SRS second axial end and a plurality of second rotors, and wherein the inlet port is in fluid communication with the first rotor shaft adjacent the FRS first axial end of the first rotor shaft, and the first rotor shaft is in fluid communication with the second rotor shaft via a first inter-rotor passage disposed adjacent the FRS second axial end and the SRS first axial end.

3. The system of claim 2, wherein the second rotor shaft is in fluid communication with the exit port adjacent the SRS second axial end.

4. The system of claim 3, wherein the hydrogen turboexpander further comprises a bypass passage and a relief valve, wherein the bypass passage is in fluid communication with the first inter rotor passage and in fluid communication with the second rotor shaft adjacent the SRS second axial end, and the relief valve is controllable to be in an open configuration that permits fluid flow through the bypass passage and in a closed configuration that at least substantially blocks fluid flow through the bypass passage, and wherein in the closed configuration appreciably no fluid flow passes through the second RSFFP.

5. The system of claim 4, wherein the relief valve is in communication with a controller configured to control operation of the relief valve.

6. The system of claim 1, wherein the first rotor shaft and the second rotor shaft rotate independently of one another.

7. The system of claim 1, wherein the hydrogen turboexpander is configured such that the first rotor shaft rotates at a first rotational velocity, and the second rotor shaft rotates at a second rotational velocity, and the first rotational velocity equals the second rotational velocity.

8. The system of claim 1, wherein the hydrogen turboexpander is configured such that the first rotor shaft rotates at a first rotational velocity, and the second rotor shaft rotates at a second rotational velocity, and the first rotational velocity does not equal the second rotational velocity.

9. The system of claim 1, wherein the hydrogen turboexpander is configured such that the first rotor shaft produces a first amount of power from the flow of gaseous hydrogen, and the second rotor shaft produces a second amount of power from the flow of gaseous hydrogen, and the first amount of power equals the second amount of power.

10. The system of claim 1, wherein the hydrogen turboexpander is configured such that the first rotor shaft produces a first amount of power from the flow of gaseous hydrogen, and the second rotor shaft produces a second amount of power from the flow of gaseous hydrogen, and the first amount of power does not equal the second amount of power.

11. The system of claim 1, wherein at least one of the first rotor shaft or the second rotor shaft is in drive communication with a system component.

12. The system of claim 11, wherein the system component is a reduction gearbox or an electric generator.

13. The system of claim 1, wherein the hydrogen turboexpander further includes a third rotor shaft and the housing further includes a third rotor shaft cavity configured to receive the third rotor shaft, and wherein the third rotor shaft and the third rotor shaft cavity define a third RSFFP, and wherein the first rotor shaft, the second rotor shaft, and the third rotor shaft are disposed parallel one another within a housing, and wherein the third rotor shaft (TRS) has a TRS first axial end and a TRS second axial end and a plurality of third rotors; and
  wherein the inlet port is in fluid communication with first rotor shaft adjacent the FRS first axial end, and the first rotor shaft is in fluid communication with the second rotor shaft via a first inter rotor passage disposed adjacent the FRS second axial end, and the second rotor shaft is in fluid communication with the third rotor shaft via a second inter rotor passage disposed adjacent to the SRS second axial end, and the third rotor shaft is in fluid communication with the exit port adjacent the TRS second axial end.

14. The system of claim 13, wherein the hydrogen turboexpander further includes a first bypass passage and a first relief valve, wherein the first bypass passage is in fluid communication with the first inter rotor passage and in fluid communication with the second rotor shaft adjacent the SRS second axial end, and the first relief valve is controllable to be in a first open configuration that permits fluid flow through the first bypass passage and in a first closed configuration that at least substantially blocks fluid flow through the first bypass passage, and wherein in the first closed configuration appreciably no fluid flow passes through the second RSFFP; and
  wherein the hydrogen turboexpander further includes a second bypass passage and a second relief valve, wherein the second bypass passage is in fluid communication with the second inter rotor passage and in fluid communication with the third rotor shaft adjacent the TRS second axial end, and the second relief valve is controllable to be in a second open configuration that permits fluid flow through the second bypass passage and in a second closed configuration that at least substantially blocks fluid flow through the second bypass passage, and wherein in the second closed configuration appreciably no fluid flow passes through the third RSFFP.

15. The system of claim 14, wherein the first rotor shaft, the second rotor, and the third rotor shaft rotate independently of one another.

16. The system of claim 14, wherein the hydrogen turboexpander is configured such that the first rotor shaft rotates at a first rotational velocity, the second rotor shaft rotates at a second rotational velocity, and the third rotor shaft rotates at a third rotational velocity; and
  wherein the hydrogen turboexpander is operable in a first configuration wherein the first rotational velocity, the second rotational velocity, and the third rotational velocity equal one another, and is operable in a second configuration wherein one of the first rotational velocity, the second rotational velocity, or the third rotational velocity does not equal another of the first rotational velocity, the second rotational velocity, or the third rotational velocity.

17. The system of claim 14, wherein at least one of the first rotor shaft, the second rotor shaft, or the third rotor shaft is in drive communication with a reduction gearbox.

18. The system of claim 14, wherein the first rotor shaft, the second rotor shaft, and the third rotor shaft are disposed in a symmetrical arrangement about a center of the housing.

19. The system of claim 14, wherein at least one of the first rotor shaft, the second rotor shaft, or the third rotor shaft is in drive communication with an electric generator.

20. A hydrogen turboexpander, comprising:
  a housing having a first rotor shaft cavity, a second rotor shaft cavity, a gas inlet port, and a gas exit port;
  a first rotor shaft disposed in the first rotor shaft cavity;
  a second rotor shaft disposed in the second rotor shaft cavity;
  wherein the first rotor shaft and the second rotor shaft are disposed parallel one another within the housing; and
  wherein the first rotor shaft and the first rotor shaft cavity define a first rotor shaft fluid flow path (RSFFP), and the second rotor shaft and the second rotor shaft cavity define a second RSFFP; and
  wherein the hydrogen turboexpander is configured with the first RSFFP in series with the second RSFFP between the inlet port and the exit port.

* * * * *